FIG. 2

WAVELENGTH IN MILLIMICRONS
———— CHLORODEMETHYLTETRACYCLINE.HCl
– – – – CHLOROTETRACYCLINE.HCl

4  DEMETHYLTETRACYCLINE. HCl, Rf=0.30
5  TETRACYCLINE.HCl, Rf= 0.37
6  CHLORODEMETHYLTETRACYCLINE.HCl, Rf= 0.47      $Rf = \frac{2-4}{2-3} = 0.30$
7  CHLOROTETRACYCLINE.HCl  Rf=0.59

PAPER CHROMATOGRAPHIC SOLVENT SYSTEM
    0.3 M $NaH_2PO_4$
    pH 3.0/BUTANOL

FIG. 1

INVENTORS.
JERRY ROBERT DANIEL McCORMICK
URSULA HIRSCH
ELMER RAYMOND JENSEN
NEWELL OSCAR SJOLANDER
BY
ATTORNEY

March 17, 1959 J. R. D. McCORMICK ET AL 2,878,289
6-DEMETHYLTETRACYCLINES AND METHODS FOR PREPARING THE SAME
Filed May 28, 1956 5 Sheets-Sheet 5

FIG. 6

INVENTORS.
JERRY ROBERT DANIEL McCORMICK
URSULA HIRSCH
ELMER RAYMOND JENSEN
NEWELL OSCAR SJOLANDER
BY
ATTORNEY

United States Patent Office 2,878,289
Patented Mar. 17, 1959

2,878,289

6-DEMETHYLTETRACYCLINES AND METHODS FOR PREPARING THE SAME

Jerry Robert Daniel McCormick, New City, Ursula Hirsch, Pearl River, and Elmer Raymond Jensen, Nanuet, N. Y., and Newell Oscar Sjolander, Saddle River, N. J., assignors to American Cyanamid Company, New York, N. Y., a corporation of Maine Application May 28, 1956, Serial No. 587,518

9 Claims. (Cl. 260—559)

This invention relates to a new group of antibiotics which are closely related to the tetracycline antibiotics and which may be produced by a fermentation process. The invention includes the new antibiotics, their salts, and complexes, the fermentation process by which they are produced and a method of recovering the new substances.

The new antibiotics of the present invention are produced in a fermentation process in which mutant strains of *Streptomyces aureofaciens* are employed. The new antibiotics appear to be closely related to but are distinctly different from previously described members of the tetracycline family. They are characterized by marked stability under both alkaline and acid conditions and are superior to the tetracyclines in this respect. They have a similar antibiotic activity and may be used for the same purposes and in the same general manner as are the presently known tetracyclines.

Each of the previously known tetracycline antibiotics which are produced by fermentation with *S. aureofaciens* under particular conditions, namely tetracycline, chlorotetracyline and bromotetracycline, has a counterpart in the new series of antibiotics of the present invention. In other words, there is produced in accordance with the process of the present invention when using certain mutant strains of *S. aureofaciens* which will be more particularly described hereinafter an antibiotic substance similar to tetracycline, another similar to chlorotetracycline and another analogous to bromotetracycline. The particular new antibiotic that is formed as a result of the fermentation process will depend upon the nature of the nutrient medium and other conditions of the process. In a chloride-free medium the antibiotic that predominates will be the chloride-free analog of tetracycline. In a bromine-rich medium, the bromine-containing antibiotic will be formed; and in a chlorine-rich medium, the predominating antibiotic will be a chlorine-containing antibiotic analogous to chlorotetracycline. Ordinarily, some tetracycline, chlorotetracycline and/or bromotetracycline will also be formed during the fermentation process, the relative proportions of which will depend upon the chloride and/or bromide ion content of the medium and the strain of microorganism used. With careful selections of the strain of *S. aureofaciens*, it is possible to almost completely eliminate the formation of these known tetracycline antibiotics.

The new antibiotics of the present invention can be converted into epimers similarly to the manner in which the tetracyclines are converted into the quatrimycins, as described in the copending application of Doerschuk et al., Serial No. 538,402, filed October 4, 1955. See also the Journal of the American Chemical Society, 77, 4687 (1955). These epimers are also new compounds and are part of the present invention.

The chlorine- and bromine-containing antibiotics of the present invention may also be dehalogenated by hydrogenation by using palladium on charcoal as the catalyst, just as are chlorotetracycline or bromotetracycline converted to tetracycline itself.

Chemical analyses and a consideration of the chemical and physical properties of the new compounds indicate that they differ essentially from the corresponding tetracyclines in having one less methyl group. The methyl group involved is most likely the one occupying the six position on the naphthacene ring of the tetracyclines. Accordingly, the tetracycline analog of the present invention would be called 4-dimethylamino-1,4,4a,5,5a,6,11,12a-octahydro-3,6,10,12,12a-pentahydroxy - 1,11 - dioxo-2-naphthacenecarboxamide. In the case of the chlorine and bromine analogs, the halogen substituent would be on the seven position and would be named accordingly. Appropriate common names for these new antibiotics would be demethyltetracycline, chlorodemthyltetracycline and bromodemthyltetracycline and this nomenclature will be used herein. It will be understood, however, that the postulated structure has not been proven by an unequivocal synthesis and may subsequently be found to be in error. The present invention is concerned with new products and not a particular system of nomenclature or probable structure.

The new antibiotics of the present invention are produced by certain mutant strains of *S. aureofaciens*. These strains are unquestionably of the species *Streptomyces aureofaciens*, inasmuch as they were derived from the original A–377 isolated by Dr. B. M. Duggar and deposited at the Northern Regional Research Laboratories at Peoria, Illinois, and indexed there as NRRL 2209. Mutations involving treatment of A–377 with mutagenic agents including successively ultraviolet irradiation, nicotine, and nitrogen mustard were employed to develop one of the strains. Various other strains have been obtained by spontaneous mutation and by treatment with mutagenic agents. These several strains which produce the new antibiotics in differing proportions and effectiveness have the general characteristics of the species *S. aureofaciens*. They differ somewhat among themselves and from previously described strains of *S. aureofaciens* primarily in pigmentation and their ability to produce the new antibiotics. In most cases a reddish-brown pigment is noted when the microorganisms are grown on conventional culture media. The shades of pigment range from peach-tan or copper-brown to deep brown-mahogany or burgundy depending upon the particular strain and the nutrient medium used. Although the property of producing the new antibiotics of the present invention is generally associated with strains having this type of pigmentation, yet this pigment production and production of the new antibiotic is not necessarily a common property. All of the strains studied produce some chlorotetracycline and generally some tetracycline, although the relative proportions of these antibiotics may vary considerably depending upon the nature of the fermentation medium, the fermentation conditions and the particular strain chosen. In some cases the production of chlorotetracycline and tetracycline is very low, of the order of a few percent of total antibiotic produced by the fermentation.

The mutant strains which produce the new antibiotics of the present invention possess the same general characteristics as do the strains which produce the tetracyclines and differ among themselves in the same general manner that the tetracycline strains differ from each other, as has been described in a number of scientific papers which have been published. Although many strains of *S. aureofaciens* are available to the public from culture collections and many have been described in patents and scientific literature, the following data will serve to illustrate the type of variation of the new strains from the original A–377 strain available as NRRL 2209.

COMPARISON OF *S. aureofaciens* STRAINS S-604 AND A-377 ON VARIOUS MEDIA

*Streptomyces aureofaciens* strain S-604, which produces chlorodemethyltetracycline and demethyltetracycline was compared with *Streptomyces aureofaciens* strain A-377 (NRRL 2209) by observation of growth characteristics on various media incubated at 26–27° C.

Observations were as follows:

(1) Glycerol asparagine beef extract agar

| | |
|---|---|
| Glycerol | percent  1.0 |
| L-asparagine | do  0.05 |
| Beef extract | do  0.2 |
| $KH_2PO_4$ | do  0.05 |
| Bacto agar | do  1.5 |
| Distilled water q. s. | do  100.0 |
| pH adjustment with 50% KOH | 7.0 |
| Post sterilization pH | 7.1 |

| | *Streptomyces aureofaciens* | |
|---|---|---|
| | Strain S-604 | Strain A-377 |
| Growth | Abundant, Venetian red [1] | Fair. |
| Aerial Hyphae | Abundant, White to Rose Grey.[1] | White, Uniform. |
| Sporulation | Slight becoming Abundant. | None. |
| Diffusible Pigment | Reddish-brown | Yellow. |
| Reverse | Brown-Mahogany [1] | Yellow to Light Orange-Yellow. |

[1] Color Harmony Manual, Third Edition, Container Corporation of America.

(2) Dextrin czapek-dox agar

| | |
|---|---|
| Dextrin | percent  1.0 |
| $NaNO_3$ | do  0.2 |
| $K_2HPO_4$ | do  0.1 |
| $MgSO_4.7H_2O$ | do  0.05 |
| KCl | do  0.05 |
| $FeSO_4.7H_2O$ | do  0.001 |
| Bacto agar | do  1.5 |
| Distilled water q. s. | do  100.0 |
| Post sterilization pH | 7.0 |

| | *Streptomyces aureofaciens* | |
|---|---|---|
| | Strain S-604 | Strain A-377 |
| Growth | Sparse, hyaline | Profuse. |
| Aerial Hyphae | None | Abundant, Lead Grey,[1] Water-White Surface Globules. |
| Sporulation | do | Abundant. |
| Diffusible Pigment | do | Slight: Pale Yellow. |
| Reverse | Apigmentous | Apigmentous. |

[1] Color Harmony Manual, Third Edition, Container Corporation of America.

(3) Corn steep agar

| | |
|---|---|
| Corn steep | percent  0.4 |
| Sucrose | do  1.0 |
| $MgSO_4.7H_2O$ | do  0.025 |
| $KH_2PO_4$ | do  0.2 |
| $(NH_4)_2HPO_4$ | do  0.2 |
| Bacto agar | do  2.0 |
| Tap water q. s. | do  100.0 |
| Post sterilization pH | 6.3 |

| | *Streptomyces aureofaciens* | |
|---|---|---|
| | Strain S-604 | Strain A-377 |
| Growth | Profuse | Profuse. |
| Aerial Hyphae | Abundant, Dk. Rose Taupe.[1] | Abundant, Beaver.[1] |
| Sporulation | Very Abundant, Uniform. | Very Abundant, Uniform. |
| Diffusible Pigment | Very concentrated; Deep Brown [1] to Deep brown Mahogany.[1] | Light Greenish-Yellow. |
| Reverse | Dk. Brown Mahogany [1] | Covert Brown.[1] |

[1] Color Harmony Manual, Third Edition, Container Corporation of America.

(4) Other media

| | *Streptomyces aureofaciens* | |
|---|---|---|
| | Strain S-604 | Strain A-377 |
| Nutrient agar | Poor growth. Taupe brown[1] to dark brown[1]. No aerial hyphae. Reverse: Taupe brown [1]. Reddish brown soluble pigment. | Fair growth. No aerial hyphae. Reverse: pale yellow. Yellow to light brownish-yellow soluble pigment. |
| Glucose Asparagine meat extract agar | Abundant growth. Heavy aerial hyphae mottled: Rose taupe [1] to Fawn [1] to Camel [1]. Sporulation: abundant. Reverse: Taupe brown [1]. Reddish brown soluble pigment. | Fair growth. Aerial hyphae white becoming increasingly grey with increase in spore formation. Reverse: light yellow. Light yellow soluble pigment. |
| Potato Slants | Profuse moist smooth nodulated growth: Dark brown mahogany [1] with peach tan [1] trace. Aerial hyphae: none to abundant becoming white to camel [1]. Sporulation abundant in areas of heavy aerial hyphae formation. Chocolate [1] to chocolate brown [1] soluble pigment. | Profuse moist smooth nodulated growth: Light melon yellow [1] to Antique rose [1]. Aerial hyphae: Trace. No soluble pigment. |
| Purple Milk | Slight deep red mahogany [1] growth [1] collar. Little significant pH change nor apparent peptonization. Slight false alkaline color reaction due to diffusion of soluble pigment. | Slight white to pale yellow growth collar. Little significant pH change nor apparent peptonization in 15 days. |

[1] Color Harmony Manual, Third Edition, Container Corporation of America.

On all agars, except Dextrin Szapek-Dox, but including potato slant growth, *S. aureofaciens* strain S-604 characteristically produces deep pigmentation generally appearing with growth. Similarly, readily observable is the characteristic soluble reddish-brown pigment.

(5) Microscopic observations

| | *Streptomyces aureofaciens* | | | |
|---|---|---|---|---|
| | Strain S-604 | | Strain A-377 | |
| Medium | Mycelium | Spores | Mycelium | Spores |
| Glycerol Asparagine Beef Extract Agar | Flexuous, continuous, branched. Diam. 0.8 $\mu$ to >1.0 $\mu$ | Spheroidal to ovoidal. Diam. 1.5-2.0 $\mu$ | Flexuous, continuous, branched. Diam. 0.7 $\mu$ to >1.0 $\mu$ | Spheroidal to ovoidal. Diam. 1.5-2.0 $\mu$. |
| Corn Steep Agar | Flexuous, continuous, branched. Diam. 0.8 $\mu$ to >1.0 $\mu$ | Spheroidal to ovoidal. Diam. 1.5-2.0 $\mu$ | Flexuous, continuous, branched. Diam. 0.8 $\mu$ to >1.0 $\mu$ | Spheroidal to ovoidal. Diam. 1.5-2.0 $\mu$. |

Mycelial and spore morphology for Strain S-604 is apparently similar to that observed for Strain A-377. Both strains demonstrate continuous, flexuous, branched mycelium with an occasional tendency of aerial hyphae towards spiraling. Characteristic spores are ovoidal to spheroidal in shape.

To illustrate the color variations among the several strains of *S. aureofaciens* which produce the new demethyltetracyclines of the present invention, four selected strains were grown on corn steep agar and the following observations were made:

COLOR OBSERVATIONS[1]: *Streptomyces aureofaciens*: Corn steep agar (AP$_4$): Four-Day Incubation at 27° C.

| Strain | Single Colonies | Mass Growth |
| --- | --- | --- |
| S-604M1 | Deep red mahogany | Deep red mahogany. |
| S1071 | Copper brown | Deep brown mahogany to Red mahogany. |
| V-62 | Wide marginal area peach tan becoming light copper brown at the colony center. | Light copper brown. |
| B-740 | Dark Wine | Burgundy. |

[1] Colors according to the Color Harmony Manual, Third Edition, Container Corporation of America.

A relatively simple procedure of selecting a strain of *S. aureofaciens* that will produce the new antibiotics of the present invention is to select a strain of *S. aureofaciens* which has dark maroon colonies when grown on corn steep-agar medium. Inocula are prepared from these colonies and a fermentation is carried out as described in Examples 1 and 2 which follow. At the end of the fermentation period, a quantity of the fermentation liquor is acidified to a pH of about 1.5 to solubilize the antibiotic and filtered to obtain a clear aqueous solution. One or two drops of the filtrate is placed on a paper strip and chromatographed by standard chromatographic development procedures. Butanol equilibrated with 0.3 molar aqueous phosphate buffer at pH 3 is used as the solvent. The paper strips are developed by descending chromatography with the solvent phase of the equilibrated mixture. The location of the spots corresponding to the antibiotics of the present invention is readily determined by inspection under ultraviolet light. An alternative and more sensitive method consists of placing the strip on an agar plate seeded with antibiotic-sensitive micro-organisms such as *Bacillus cereus* or *Bacillus subtilis* and incubating the plates. Zones of inhibition become apparent in the regions corresponding to the antibiotic spots. Comparison of the spots with control samples of the pure antibiotics and the Rf values which are set forth hereinafter provides a basis for detecting the presence of the new antibiotics in the fermented liquor and a semi-quantitative basis for determining the amount present.

Figure 1:
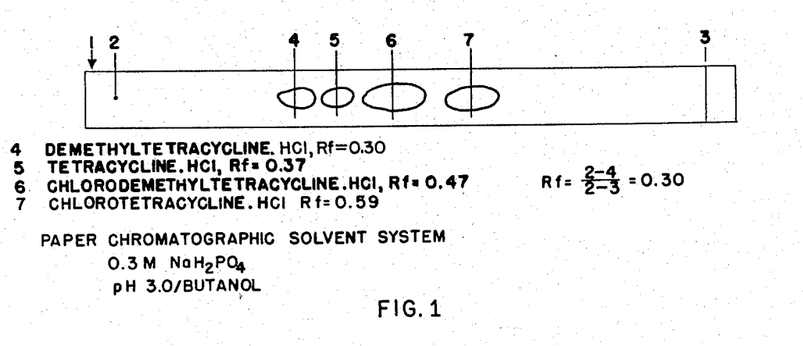

An illustration of this technique may be given with the assistance of Figure 1 of the drawing which shows how paper-strip chromatography can separate and detect the various tetracyclines and the products of the present invention from each other. The drawing represents a paper strip, 1, on which a small amount of an antibiotic solution containing tetracycline, chlorotetracycline, demethyltetracycline and chlorodemethyltetracycline was placed at point 2. The total antibiotic activity of the solution placed at point 2 was 30 gammas expressed as tetracycline. The paper strips were then developed as described above. After a period of time, the strips were inspected by ultraviolet light with the results shown in the drawing. The solvent front had advanced to the point indicated by the solid line, 3. The tetracycline component of the mixed antibiotic solution had advanced to point 5, and the chlorotetracycline had advanced to point 7. The new antibiotic demethyltetracycline had advanced to point 4, and antibiotic chlorodemethyltetracycline was found at point 6. The Rf values of these antibiotics are also shown on the drawing. The Rf value is defined as the distance of the spot from the point of origin, 2, divided by the distance of the solvent front, 3, from the origin, 2, and are, of course, always less than 1. Various solvent systems may be used to obtain a series of Rf values for any particular antibiotic, and these values are considered very valuable in identifying antibiotics and distinguishing them from others.

The Rf values of a number of the tetracyclines, quatrimycins and the new products of the present invention in two specific solvent systems are shown in the following table.

| Antibiotic | Ethyl acetate/ pH 4.7 Citrate phosphate Buffer (McElvain) | 90-10 chloroform-Butanol/ aqueous 0.3 M $H_3PO_4$+0.1% trichloroacetic acid pH 1.9 |
| --- | --- | --- |
| Chlorotetracycline | 0.76-0.80 | 0.61 |
| Bromotetracycline | 0.76-0.80 | 0.61 |
| Tetracycline | 0.46-0.47 | 0.20 |
| Quatrimycin | 0.14-0.16 | 0.12 |
| Chlorquatrimycin | 0.27-0.28 | 0.33 |
| Bromquatrimycin | 0.27-0-28 | 0.33 |
| Oxyquatrimycin | 0.00-0.06 | 0.11 |
| Chlorodemethyltetracycline | 0.68-0.72 | 0.39 |
| Demethyltetracycline | 0.27 | 0.22 |
| Epichlorodemethyltetracycline | 0.25-0.27 | 0.20 |
| Epidemethyltetracycline | 0.09 | 0.10 |

In order that the present invention may be practiced by the public without undue experimentation after the term of the present patent, several strains of *S. aurofaciens* which produce the new antibiotic have been deposited at the American Type Culture Collection, Washington, D. C., with the understanding that they will be released to the public, upon issuance of a patent to the present applicants involving the use of these organisms, for investigational purposes during the lifetime of the patent and freely thereafter. These are cataloged at the Collection as ATCC 12551, 12552, 12553 and 12554. It will be understood, of course, that mutants which will also produce the new antibiotics, may be derived from these strains by conventional procedures; and, in fact, it is to be expected that some of these may have the capacity to produce higher yields of one or more of the new antibiotics under favorable conditions. These mutants may vary somewhat in general morphological characteristics as do the various strains of the *S. aureofaceins* species. It is also expected that other demethyltetracycline-producing strains of *S. auerofaciens* may be found in nature and may be developed from presently isolated strains of *S. aureofaciens* which do not produce these new antibiotics.

One of the most important advantages of the demethyltetracycline over the previously described tetracyclines is their increased stability in acids and alkalis. The acid instability of tetracycline and the alkali instability of chlorotetracycline are well known. Chlorotetracycline in an aqueous solution with a sodium carbonate buffer at pH 9.85 has a half life of 29.2 minutes at 23° C. By contrast, chlorodemethyltetracycline loses no more than 6 percent of its activity in 24 hours under the same conditions. Tetracycline is completely destroyed in less than 5 minutes in 1 N sulfuric acid at 100° C. On the other hand, chlorodemethyltetracycline loses only about 2 percent of its activity in 1 N sulfuric acid at 100° C. after 15 minutes. Similarly, the new antibiotic demethyltetracycline loses only about 33 percent of its activity in 1 N hydrochloric acid at 100° C. in 6 minutes. In 0.1 N sodium hydroxide at 50° C., demethyltetracycline has a half life of about 20 hours as compared to 3.3 hours for tetracycline. These unexpected properties are very valuable inasmuch as the acid instability of tetracycline and the alkali instability of chlorotetracycline has limited or completely precluded the use of these valuable substances in many applications. By virtue of the much better stability of the new antibiotics, it is possible to prepare many pharmaceutical products which could not be satisfactorily compounded with the tetracyclines. The increased stability also makes it possible to improve the recovery and refining processes since more drastic pH and temperature conditions can be employed and the efficiency of various steps in the process can therefore be improved.

Chemical analyses of highly purified samples of chlorodemethyltetracycline have checked within experimental error, with the calculated empirical formula $C_{21}H_{21}ClO_8$.

The Kuhn-Roth method for determining methyl groups resulted in an extremely low value, indicating that there was no methyl group on the seven position of the naphthacene ring. Accordingly, the name chlorodemethyltetracycline appears to be appropriate. This is particularly true in view of a comparison of the ultraviolet and infrared absorption spectra of the products with the several tetracyclines.

The melting point of chlorodemethyltetracycline as the free base when measured on a hot stage was 170–175° C. with decomposition. The melting point of chlorotetracycline is 168–169° C. Demethyltetracycline, free base, melts at 170–177° C. with decomposition whereas tetracycline melts on the hot stage at 160–168° C.

Other comparisons between chlorotetracycline and chlorodemethyltetracycline are as follows. Chlorodemethyltetracycline has a pKa value of 4.45 in 50/50 dimethyl formamide-water. Chlorotetracycline has a value of 4.50 in the same system. The optical rotation of chlorodemethyltetracycline in 0.03 N hydrochloric acid at a concentration of 0.5 percent was $[\alpha]_D^{25} = -261°$; for chlorotetracycline it is $-243°$. The demethyltetracyclines appear to be more water-soluble than the corresponding tetracyclines. For example, chlorodemethyltetracycline hydrochloride is soluble in water to the extent of about 45 milligrams per milliliter as compared to about 14 milligrams per milliliter for chlorotetracycline.

The antibacterial activity of the tetracyclines and demethyltetracyclines is generally similar but with distinct differences as will be seen from the following table.

This table compares the concentrations of chlorotetracycline and chlorodemethyltetracycline necessary to effect half maximum inhibition of growth in terms of micrograms of antibiotic per milliliter of solution at periods of time ranging from 4 to 48 hours with varying microorganisms. The low values indicate more effective inhibition of growth.

the bacterial growth has resumed in the case of chlorotetracycline but is still generally inhibited in those solutions containing chlorodemethyltetracycline. This is an effect of the better stability of the latter antibiotic. Similar results are observed when tetracycline is compared with demethyltetracycline and bromotetracycline with bromodemethyltetracycline. It has also been found that the demethyltetracyclines are considerably superior to oxytetracycline in the same type of test.

The demethyltetracyclines have also been compared with the tetracyclines in "in vivo" tests, and it has been found that there is no appreciable difference in the antibacterial activity of the demethyltetracyclines when compared with their corresponding tetracycline analogs. It is concluded, therefore, that these new antibiotics may be used for the treatment of the same diseases in the same general manner as the tetracyclines are now being used.

Figure 2:
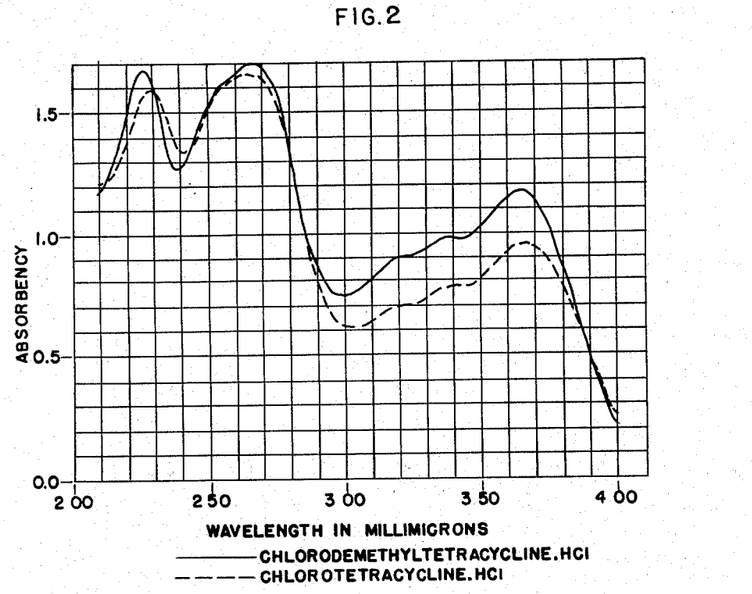

The ultraviolet absorption spectra of the tetracyclines and the demethyltetracyclines are very similar. Figure 2 of the drawings shows a comparison between the ultraviolet absorption spectrum of chlorotetracycline and chlorodemethyltetracycline at the same concentration. As will be noted, the form of the curves is essentially the same, there being, however, a slight flattening of the chlorodemethyltetracycline absorption spectrum in the neighborhood of 260 mμ.

A further comparison of the ultraviolet absorption spectra of the tetracyclines is shown in Table II wherein the extinction coefficient values $$E_{1\,cm.}^{1\%}$$

(spectrophotometric absorption of a 1 percent solution measured in a 1 cm. cell) measured at the maxima and minima of the several antibiotics is shown. The values are computed from the ultraviolet absorption curves by correcting the concentration at which the samples were

TABLE I

| Microorganism | Antibiotic | | | | | | | |
|---|---|---|---|---|---|---|---|---|
| | Chlorotetracycline | | | | Chlorodemethyltetracycline | | | |
| | Time in Hours | | | | | | | |
| | 4 | 8 | 24 | 48 | 4 | 8 | 24 | 48 |
| Staphylococcus aureus ATCC 6538P | 0.041 | 0.072 | 0.57 | 4.1 | 0.065 | 0.094 | 0.41 | 0.68 |
| Staphylococcus albus | 7.5 | 20.5 | >50.0 | >50.0 | 16.5 | 50.0 | >50.0 | >50.0 |
| Escherichia coli | 0.12 | 0.27 | 1.5 | 10.2 | 0.16 | 0.3 | 0.66 | <1.56 |
| Salmonella gallinarum | 0.4 | 0.74 | 4.65 | 37.0 | 0.4 | 0.56 | 1.06 | >0.8 |
| Bacillus cereus | <0.025 | 0.035 | 0.15 | 1.1 | <0.015 | 0.039 | 0.077 | 1.1 |
| Pseudomonas aeruginosa | 0.31 | 0.56 | 6.3 | 35.0 | 0.94 | 1.3 | 4.3 | 0.19 |
| Streptococcus pyogenes β hemolytic | 11.5 | 43.0 | >50.0 | >50.0 | 14.4 | 41.0 | >50.0 | 6.7 |
| Proteus vulgaris | 0.28 | 0.56 | 9.2 | 50.0 | 0.62 | 1.12 | 1.38 | >50.0 |
| Escherichia coli ATCC 9637 | 0.54 | 1.18 | 6.6 | 34.0 | 0.43 | 0.67 | 0.97 | 4.4 |
| | | | | | | | | 1.8 |

As will be seen from an inspection of the values in the above table, chlorotetracycline is, generally speaking, slightly more active at a period of four hours. However, it will be noted that after solutions have stood for a while run to 1 percent. All samples were measured in 0.1 N H₂SO₄ solution.

TABLE II

| Antibiotic | Max. | | Min. | | Max. | | Min. | | Max. | |
|---|---|---|---|---|---|---|---|---|---|---|
| | $E_{1\,cm.}^{1\%}$ | mμ | $E_{1\,cm.}^{1\%}$ | mμ | $E_{1\,cm.}^{1\%}$ | mμ | $E_{1\,cm.}^{1\%}$ | mμ | $E_{1\,cm.}^{1\%}$ | mμ |
| Chlorotetracycline hydrochloride | 209 | 368 | 135 | 302 | 356 | 265 | 288 | 242 | 343 | 228 |
| Epichlorotetracycline-NH₄ | 170 | 368 | 100 | 302 | 332 | 254 | 290 | 242 | 342 | 228 |
| Tetracycline hydrochloride | 305 | 355 | 182 | 299 | 393 | 268 | 191 | 232 | 289 | 217 |
| Epitetracycline-NH₄ | 290 | 355 | 140 | 299 | 326 | 254 | 200 | 232 | 275 | 216 |
| Demethyltetracycline neutral | 292 | 353 | 169 | 298 | 395 | 268 | 202 | 232 | 299 | 217 |
| Epidemethyltetracycline hydrochloride | 310 | 355 | 162 | 299 | 367 | 255 | 228 | 232 | 306 | 217 |
| Chlorodemethyltetracycline hydrochloride | 249 | 368 | 160 | 299 | 362 | 268 | 270 | 238 | 357 | 227 |
| Epichlorodemethyltetracycline hydrochloride | 242 | 368 | 130 | 300 | 348 | 254 | 289 | 238 | 346 | 227 |

Figure 3:
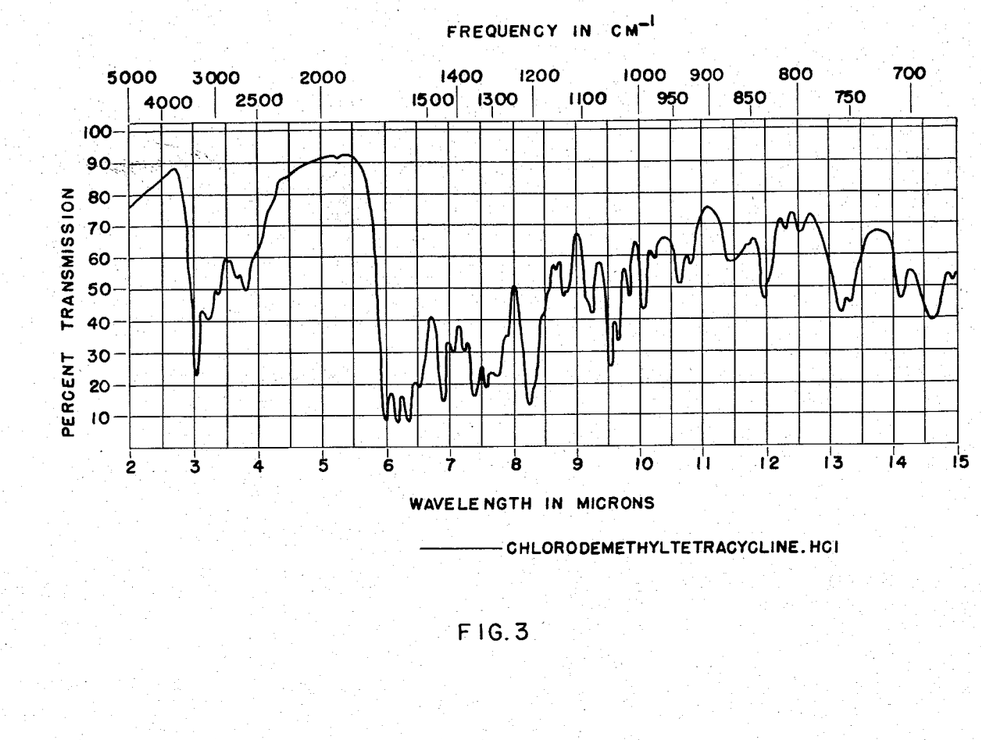
Figure 4:
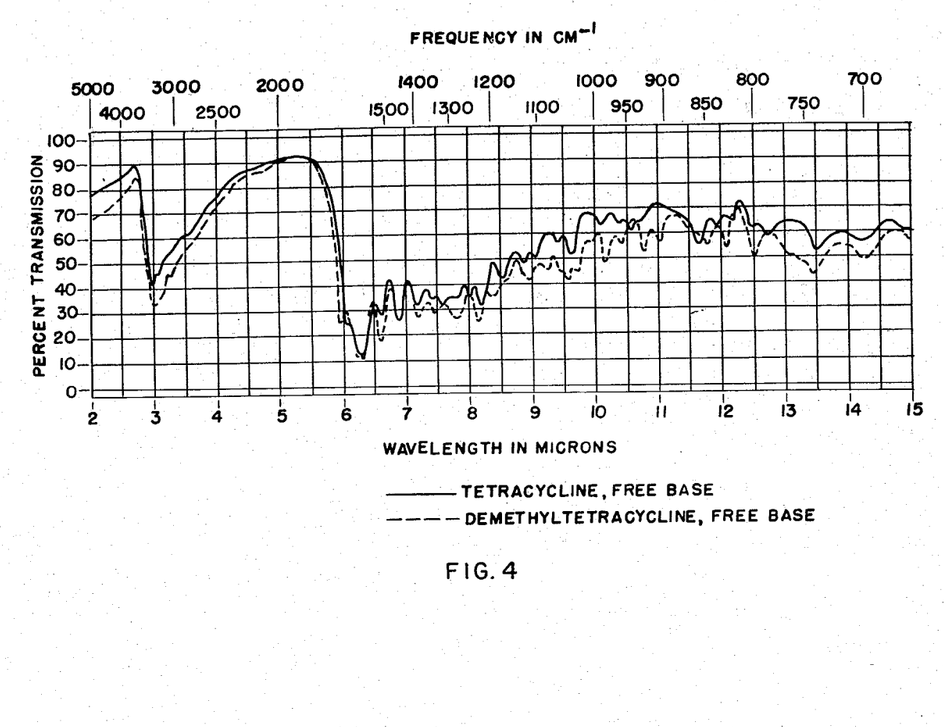
Figure 5:
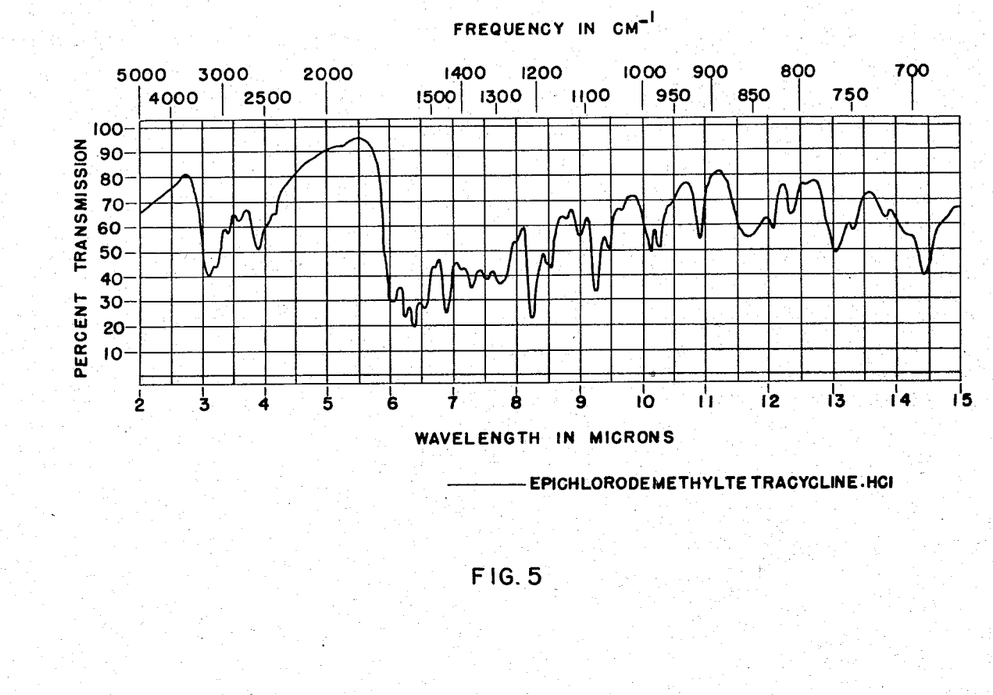
Figure 6:
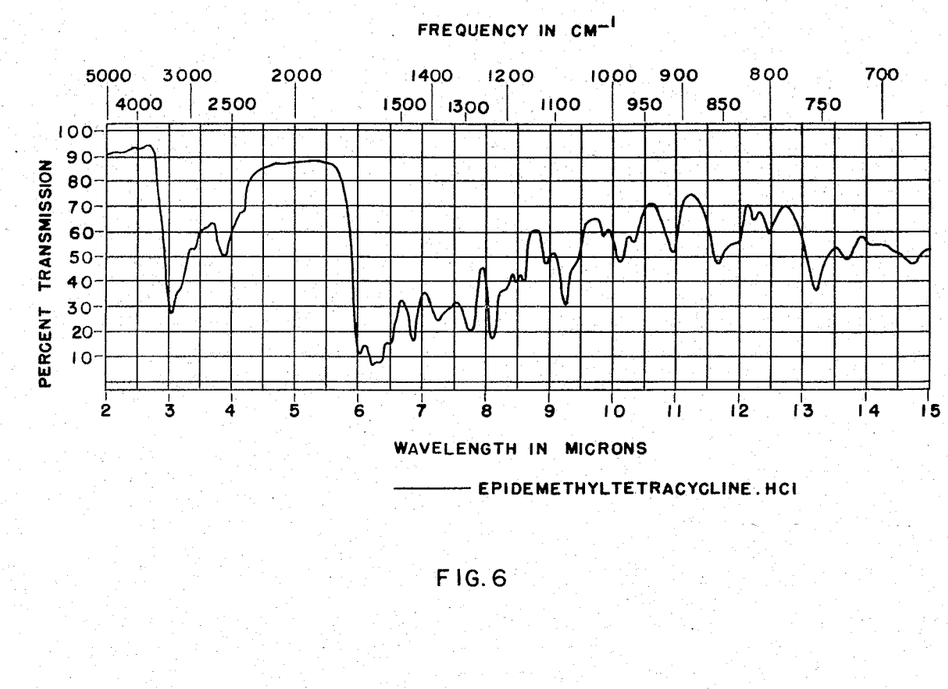

The infrared absorption spectra of several of the new products of the present invention are shown in the remaining Figures of the drawings. Figure 3 is a representation of the infrared absorption spectrum of chlorodemethyltetracycline hydrochloride. Figure 4 represents a comparison of the infrared absorption spectra of tetracycline, free base, and demethyltetracycline, free base. As will be noted, there are a number of distinct differences as well as similarities. Figure 5 shows the infrared absorption spectrum of epichlorodemethyltetracycline hydrochloride, and Figure 6 is the absorption spectrum of epidemethyltetracycline hydrochloride. These curves were run on a Perkin-Elmer Model 21 Automatic Recording Infrared Spectrophotometer with the antibiotics in a solid phase compressed in a disc with KBr. Additional data is as follows: Prism—NaCl; Resolution—2; Response—1-1; Gain—5; Speed ½ min./$\mu$; Suppression—2; and Scale $2''/\mu$.

Various methods of assaying the tetracyclines have been developed; and some of these can be used in assaying the demethyltetracyclines with, of course, suitable modifications. The fluorometric assay for chlorotetracycline is based on an increase in fluoroescence due to the formation of an isochlorotetracycline under alkaline conditions. The sample to be assayed is dissolved in an alkaline phosphate buffer, and the fluoroescence of the solution is determined in a fluorophotometer at 0 time (immediately on preparation of the solution) and again after standing to permit the isomerization to occur. The increase in fluoroescence corresponds to the amount of chlorotetracycline present. The presence of chlorodemethyltetracycline in the solution may interfere, however, with the chlorotetracycline response tending to result in a spuriously low chlorotetracycline. A more reliable method for determining chlorotetracycline in mixtures with chlorodemethyltetracycline is based on the fact that the alkaline degradation product of chlorotetracycline does not absorb at 380 m$\mu$. The sample is prepared at pH 10 using carbonate buffer and the change in absorption at 380 m$\mu$ is measured after standing for 30 minutes (approximately three half lives of chlorotetracycline). Both chlorotetracycline and chlorodemethyltetracycline absorb before alkaline degradation but only chlorodemethyltetracycline absorbs after the degradation treatment; and the decreased absorption is a measure of the chlorotetracycline originally present in the sample.

A specific assay for chlorodemethyltetracycline in the presence of other tetracycline antibiotics is based on the so-called Hiscox method. A mild acid treatment of 15 minutes at 100° C. with 1 N HCl destroys all tetracyclines except chlorodemethyltetracycline. A portion of the sample so treated is then subjected to a strong acid treatment of 15 minutes at 100° C. with 6 N HCl to destroy the chlorodemethyltetracycline. The chlorodemethyltetracycline content is calculated by measuring the loss in spectrophotometric absorption at 368 m$\mu$ or the increase at 430 m$\mu$ which is effected by the strong acid treatment and comparison with a standard.

A mixture containing only two components, such as those containing the two members of an epimeric pair, may be assayed by a method described in copending application Serial No. 538,402, filed October 4, 1955. The spectrophotometric absorptions are determined at two wavelengths and the ratio of these absorptions is interpolated linearly between the known values for the pure components. The percent composition of the mixture can thus be determined.

Bromodemethyltetracycline may be assayed most simply by analysis for bromine content by standard microanalytical procedures.

As indicated above, bromodemethyltetracycline may be obtained as the principal antibiotic of the fermentation by controlling the halogen content of the fermentation. Generally the aqueous nutrient medium should contain at least 50 parts per million of bromide ions and the chloride ion content should be kept as low as possible, less than about 50 parts per million of chloride ions. Preferably the medium should contain from about 100 to 1500 parts per million of bromide ions and less than about 10 parts per million of chloride ions. The bromide ion may be supplied by any water-soluble bromide salt, such as potassium bromide, which will release bromide ions for use in the biological synthesis of the antibiotic.

Except for the control of the halogen ion content of the fermentation, the process of producing bromodemethyltetracycline is similar to that of producing demethyltetracycline and chlorodmethyltetracycline as described herein. Strains of *S. aureofaciens* which produce demethyltetracycline may also be used to produce the bromo analog.

Bromodemethyltetracycline has substantially the same antibacterial activity as does chlorodemethyltetracycline and can be used for the same purposes and in the same manner.

It is not necessary to separate bromodemethyltetracycline from the other antibiotics which may be concurrently produced during the fermentation since a mixture of the various demethyltetracyclines is useful for many purposes; for example, the fermented nutrient medium may be concentrated and used directly for its antibiotic content. Another manner of such use is to acidify the fermented liquor, filter to remove mycelia and insoluble matter, neutralize and concentrate to obtain a dry powder which can be mixed with animal feeds. The mixed antibiotics are useful in stimulating the growth of many animals.

A crude form of bromodemethyltetracycline and mixtures of this with other antibiotics may be used in preserving meats, poultry and fish in the same manner that the tetracyclines are now used. In these compositions very little attention need be given to the proportions of the various tetracyclines that may be present therein.

In the event that it is desired to separate bromodemethyltetracycline from the other antibiotics contained in the fermented liquor, this can be done in a number of ways which will be apparent to those skilled in the art. For instance, treatment with acid will destroy the tetracycline; and treatment with an alkali will destroy the chloro and bromotetracyclines in the fermented liquor. Bromodemethyltetracycline can be recovered from the resulting solutions by partition chromatography using diatomaceous earth in the column. A mixture of chloroform and butanol at a pH of about 2.0 will elute the antibiotics from the diatomaceous earth. Bromodemethyltetracycline comes off the column ahead of demethyltetracycline and may be recovered from the eluant. Bromodemethyltetracycline may also be separated into a single antibiotic component by use of the Craig countercurrent distribution technique.

The epidemethyltetracyclines of the present invention are considered to be isomers of the demethyltetracyclines. The structural differences appear to be based upon a rearrangement of the dimethyl-amino group on the $C_4$ carbon atom. Apparently under certain conditions which will be described in more detail hereinafter, inversion occurs and an equilibrium mixture of the demethyltetracycline and its epimer occurs. The two may be separated to obtain substantially pure products. For each of the demethyltetracycline, chlorodemethyltetracycline and bromodemethyltetracycline, there is a corresponding isomer which we designate as epidemethyltetracycline, epichlorodemethyltetracycline and epibromodemethyltetracycline.

The demethyltetracyclines can be converted into their isomeric forms by simply adjusting the hydrogen ion concentration of a concentrated solution of the antibiotic to within the range of pH 3.0 to 5.0 and allowing the solution to stand until the isomerization has come to an equilibrium. The method of preparing these isomers is substantially the same as that described for isomerizing the tetracyclines, as disclosed in the copending application of A. P. Doerschuck et al., Serial No. 538,402, filed October 4, 1955, for an improvement in Antibiotics and Production of Same. The most important conditions which need to be controlled for the conversion of the demethyltetracyclines to their isomers are concentration, hydrogen ion concentration, time and temperature.

The isomerization is most conveniently carried out at room temperature, although a higher rate of conversion takes place at higher temperatures. The pH should be within the range of about 3.0 to 5.0, preferably between 3.5 and 4.5. Some epimerization will take place at hydrogen ion concentrations outside these ranges and even in distilled water; but the rate is very slow. The concentration of the antibiotic in the aqueous solution should be as high as possible in order to obtain the faster rates of epimerization. Complete equilibration may require the period of time of about 24 hours at 25° C., but satisfactory equilibration may require a considerably shorter time under specific conditions. Ordinarily, however, best ressults are obtained by allowing the solutions to stand for periods of time of one week or more. An equilibrium appears to be reached in most cases at about 50 percent; this is, about half of the demethyltetracycline is converted to epimer at equilibrium.

Inasmuch as concentration is an important factor in obtaining high yields in short periods of time, a solvent system should be selected which will give the highest concentration of the demethyltetracycline. These solvent systems should be buffered to obtain a pH within the preferred range. Various solvents include methanol, ethanol, butanol, acetone, 2-ethoxy ethanol, 2-methoxy propanol, tetrahydrofuran, dimethylformamide and mixtures of these solvents. Still other solvents may be used. A preferred buffering agent is sodium dihydrogen phosphate, although other buffers and buffer pairs may be used which will maintain the hydrogen ion concentration within the desired range.

The epimers of the present invention may be recovered from aqueous solution in the same general manner that the tetracyclines may be recovered. Although they have slightly less antibacterial activity in vitro and in vivo as compared to the demethyltetracyclines, they are still highly useful in the treatment of disease caused by bacteria by virtue of their substantial antibacterial activity.

As would be expected, the demethyltetracyclines form salts and complexes of the same type and in the same general manner as do the tetracyclines. Treatment with acids of pH of less than about 4 will result in the formation of acid salts. The free base may be obtained at a pH within the range of about 4 to 6; and at pH's higher than 6, salts with the bases, such as the calcium salt, are obtained. Similarly, salts of the epimers are formed.

FERMENTATION PROCESS

As previously indicated the process of producing the new antibiotics of the present invention will be generally the same as those for the production of chlorotetracycline (see United States Patents Nos. 2,482,055 and 2,609,329), tetracycline (see United States Patent No. 2,734,018), and bromotetracycline (see United States application Serial No. 580,663), [see also the Journal of the American Chemical Society, 78, 1508 (1956)], with principal differences being in the selection of a mutant strain of S. aureofaciens which will produce the desired demethyltetracycline instead of one of the tetracyclines. The composition of the fermentation medium, the rate of aeration, time, temperature, hydrogen ion control, method of inoculation and the like, as set forth in these above-identified patents and application, are suitable for the production of the new demethyltetracyclines.

*Example 1.*—A suitable medium for the preparation of inocula for these fermentations may be prepared with the following substances.

| | | |
|---|---|---|
| Sucrose | g./l | 30 |
| $(NH_4)_2SO_4$ | g./l | 2 |
| $CaCO_3$ | g./l | 7 |
| Corn steep liquor | ml./l | 16.5 |

The pH of the medium thus prepared is about 6.8. An 8 milliliter portion is measured into an 8-inch Brewer tube and sterilized at 120° C. for 20 minutes. The sterilized medium is then inoculated with 0.5 ml. of an aqueous spore suspension of a strain of S. aureofaciens capable of producing chlorodemethyltetracycline, such as S-604, containing approximately 40-60 million spores per milliliter. The inoculated medium is incubated for 24 hours at 28° C. on a reciprocating shaker operated at 110 cycles per minute.

A suitable fermentation medium contains water and a source of assimilable carbon and nitrogen and essential mineral salts. A typical medium suitable for production of chlorodemethyltetracycline is as follows:

| | | |
|---|---|---|
| Corn starch | g./l | 55 |
| $CaCO_3$ | g./l | 7 |
| $(NH_4)_2SO_4$ | g./l | 5 |
| $NH_4Cl$ | g./l | 1.5 |
| $FeSO_4.7H_2O$ | mg./l | 40 |
| $MnSO_4.4H_2O$ | mg./l | 50 |
| $ZnSO_4.7H_2O$ | mg./l | 100 |
| $CoCl_2.6H_2O$ | mg./l | 5 |
| Corn steep liquor | g./l | 30 |
| Cottonseed meal | g./l | 2 |
| Lard oil | percent v./v | 2.0 |

Restricting the chloride ion content of this medium tends to increase the amount of demethyltetracycline at the expense of chlorodemethyltetracycline production.

*Example 2.*—A shaker flask fermentation which resulted in the production of some of each of demethyltetracycline and chlorodemethyltetracycline was conducted with a medium prepared as follows:

| | | |
|---|---|---|
| Corn steep liquor | g./l | 30 |
| Lard oil | percent v./v | 2 |
| Corn starch | g./l | 55 |
| Cottonseed meal | g./l | 2 |
| $CaCO_3$ | g./l | 7 |
| $(NH_4)_2SO_4$ | g./l | 5 |
| $NH_4Cl$ | g./l | 1.5 |
| $FeSO_4.7H_2O$ | mg./l | 40 |
| $ZnSO_4.7H_2O$ | mg./l | 100 |
| $MnSO_4.4H_2O$ | mg./l | 50 |
| $CoCl_2.6H_2O$ | mg./l | 5 |

A 25-milliliter portion was measured into a 250 milliliter Erlenmeyer flask, sterilized for 20 minutes at 120° C. and inoculated with 1 milliliter of mycelial growth prepared as in Example 1. After incubation for 120 hours at 26° C. on a rotary shaker at 186 R. P. M. the mash was assayed and found to contain not more than about 70 gammas per milliliter of chlorotetracycline, about 450 gammas per milliliter of demethyltetracycline and 900 gammas per milliliter of chlorodemethyltetracycline.

*Example 3.*—*Tank fermentation*: A 40-liter fermentation is carried out in a pilot tank, essentially according to the method described in Example 2. The medium, after preparation, is sterilized for 25 minutes at 125° C., and inoculated with strain S-604 inoculum prepared as set forth in Duggar, United States Patent 2,482,055. The fermentation is carried out with continuous agitation, at a temperature of 28° C. for the first 24 hours and 25° C. until completion at 135 hours. Sterile air is introduced at a rate of 0.3 l./l./min. for the first sixteen hours, followed by 0.5 l./l./min. to harvest.

*Example 4.*—*Refining of chlorodemethyltetracycline and demethyltetracycline*: 25.8 liters of mesh prepared as in Example 3 are treated with 200 milliliters of concentrated hydrochloric acid to adjust the pH to 1.5. The treated mesh is filtered, after mixing with 2.8 kilograms of a filter aid to obtain 16.3 liters of filtrate. The filter cake is reslurried with 25 liters of water at a temperature of about 50° C. and adjusted to pH 1.5. After stirring for 30 minutes, the reslurried cake is filtered and the filtrate is combined with the previous filtrate to form a pool of 42.3 liters. The pooled filtrate is treated with 6.76 kilograms of sodium chloride and extracted four times with 15 percent of the filtrate volume of butanol. The extracts are combined, clarified by filtration, and concentrated in vacuo at 25 to 30° C. to a final volume of 6 liters.

*Example 5.—Chromatographic separation of chlorodemethyltetracycline and demethyltetracycline*: The butanol concentrate from Example 4 is further processed in two equal aliquots, one of which is concentrated to 900 milliliters, the other of which is concentrated to 610 milliliters by vacuum concentration. The concentrates are filtered and adjusted with 50 percent sodium hydroxide to a pH of 2.

The solvent system used for the chromatographic separation is prepared by equilibrating an 80 percent butanol-20 percent chloroform mixture with water adjusted to pH 2 with hydrochloric acid. The columns are glass columns of six-inch diameter packed with 2.8 kilograms of acid washed Celite No. 545 (diatomaceous earth). The columns are equilibrated with the aqueous phase of the solvent system prior to use.

The two butanol concentrates are treated on separate columns. The concentrates are poured gently onto the tops of the columns. The columns are then eluted with the solvent phase, which is run through at a rate of approximately 10 liters per hour. In each case, forty 500-milliliter cuts are taken, and the antibiotic content of each is determined by paper strip chromatography. In the 900 milliliter run, cuts 6 to 17 contain the chlorodemethyltetracycline and chlorotetracycline, and cuts 24 to 40 contain the demethyltetracycline and tetracycline. In the 610 milliliter run, cuts 7 to 18 contain the chlorodemethyltetracycline and chlorotetracycline, and cuts 19 to 31 contain the demethyltetracycline and tetracycline.

*Example 6.—Recovery of chlorodemethyltetracycline from column fractions*: The chlorodemethyltetracycline-containing fractions from Example 5 are combined to give a volume of about 12 liters. An equal amount of water is added, and the mixture is vacuum concentrated to 1810 milliliters of an aqueous solution. The pH of the concentrate is adjusted from 2.3 to 1.9 by the addition of hydrochloric acid. The acidified concentrate is washed twice with 180 milliliters of chloroform, filtered, and concentrated in vacuum to a volume of 360 milliliters. The pH of the concentrate is adjusted from 1.2 to 2.8 with 50 percent sodium hydroxide. The solution is freeze-dried to yield 18.56 grams of amorphous chlorodemethyltetracycline hydrochloride assaying 550 gammas per milligram.

*Example 7.—Recovery of demethyltetracycline from column fractions*: The demethyltetracycline-containing cuts from Example 5 were pooled to give a volume of 14 liters. An equal volume of water was added and the mixture was vacuum concentrated at 24° C. to a volume of 565 milliliters of aqueous solution. The pH of the concentrate was adjusted to 1.65 by the addition of concentrated hydrochloric acid, and the solution is washed twice with 55 milliliters of chloroform. The washed solution is filtered and adjusted with 50 percent sodium hydroxide to a pH of 5.8. After aging for three hours at room temperature and 15 hours at 4° C., the resulting crystal slurry is filtered and the product is washed with water and dried in vacuo at 40° C. A yield of 4.7 grams of crude neutral demethyltetracycline assaying 880 gammas per milligram as tetracycline hydrochloride is obtained, representing an overall yield of 73 percent from the aqueous concentrate.

*Example 8.—Crystallization of chlorodemethyltetracycline hydrochloride from acetone-ether*: 18.56 grams of freeze-dried chlorodemethyltetracycline as in Example 6 is stirred in a mixture of 55 milliliters of acetone, 7.4 milliliters of water and 3.7 milliliters of concentrated hydrochloric acid. The solution is filtered, and the solids are rinsed twice with a total of 55 milliliters of acetone containing 1.85 milliliter of water. The filtrates are combined, the pH being 0.8, and treated with 55 milliliters of ether. The mixture is seeded, aged for 18 hours at room temperature with constant agitation, and the crystals which form are removed by filtration. The product is washed with a mixture of acetone, water and ether, then with acetone, and finally with ether and vacuum dried at 40° C. A yield of 4.74 grams of crystalline chlorodemethyltetracycline hydrochloride assaying 1090 gammas per milligram is obtained, representing a 50.6 percent step yield. The product contains 11 percent chlorotetracycline.

*Example 9.—Crystallization of chlorodemethyltetracycline hydrochloride from butanol Cellosolve*: A 50.4 gram portion of freeze-dried chlorodemethyltetracycline prepared as in Example 6, and assaying 700 gammas per milligram, is slurried in 22.5 milliliters of Cellosolve, and to the resulting solution is added a total of 205 milliliters of butanol. The pH is adjusted to 0.8 by the addition of 11 milliliters of concentrated hydrochloric acid and the mixture is aged 51 hours with stirring. The resulting crystals are removed by filtration, washed with a 90–10 mixture of butanol-Cellosolve, then with chloroform, and vacuum dried. A yield of 30.6 grams of chlorodemethyltetracycline hydrochloride assaying 1053 gammas per milligram is obtained, a yield of 84 percent.

*Example 10.—Recrystallization of chlorodemethyltetracycline to destroy chlorotetracycline*: One gram of the chlorodemethyltetracycline prepared in Example 8, assaying 1090 gammas per milligram, is slurried in 3 milliliters of 90 percent butanol-10 percent Cellosolve, and 3 milliliters of triethylamine is added thereto to adjust the pH to 10.4. The incomplete solution is allowed to stand at room temperature for 24 hours to destroy the chlorotetracycline which may be present, after which time concentrated hydrochloric acid is added to lower the pH to 0.8 and the mixture is aged for 24 hours with agitation. The crystalline product is filtered, washed with 90 percent butanol-10 percent Cellosolve, then with chloroform, and vacuum dried at 40° C. A yield of 0.36 gram of chlorodemethyltetracycline hydrochloride, assaying 1228 gammas per milligram and containing about 2.5 percent chlorotetracycline, is obtained, representing a yield of 40 percent.

*Example 11.—Chlorodemethyltetracycline hydrobromide*: 1.0 gram of ammonium chlorodemethyltetracycline is dissolved in 20 milliliters of water and the solution is treated with 0.6 milliliter of 48 percent hydrobromic acid to adjust the pH to 1.6. The mixture is aged with stirring at room temperature for 18 hours, at which time long needle-shaped crystals of chlorodemethyltetracycline hydrobromide are present. The product is filtered, washed with 6 milliliters of water adjusted to pH 2.2 with hydrobromic acid, and vacuum dried for 5 hours at 44° C. A yield of 750 milligrams of chlorodemethyltetracycline hydrobromide is obtained.

Analysis: Calculated for $C_{21}H_{22}N_2ClBrO_8$: C=46.2; H=4.1; N=5.1; Cl=6.5; Br=14.6; O=23.4. Found: C=45.94; H=4.44; N=4.71; Cl=6.78, 6.47; Br=13.74; O (difference)=24.39, 24.70.

*Example 12.—Preparation of chlorodemethyltetracycline ammonium salt*: A 100-milligram portion of the chlorodemethyltetracycline prepared in Example 8 is dissolved in 0.5 milliliter of 90 percent butanol-10 percent Cellosolve, and ammonia gas is bubbled into the solution until a thick solid appears. The slurry is thinned with a small amount of concentrated aqueous ammonia, allowed to stand at room temperature for 5 hours, and filtered. The product is washed with 90 percent butanol-10 percent Cellosolve, then with acetone, and vacuum dried. A yield of 41.4 milligrams of chlorodemethyltetracycline ammonium salt assaying 1148 gammas per milligram as chlorotetracycline hydrochloride is obtained (44 percent yield).

*Example 13.—Preparation of chlorodemethyltetracycline neutral:* A 50-milligram portion of the chlorodemethyltetracycline obtained in Example 8, assaying 1090 gammas per milligram, is dissolved in 1.3 milliliter of water, and the solution is treated with dry sodium carbonate to a pH of 7–8. The resulting amorphous precipitate is centrifuged off, and the clear decantate is adjusted to pH 5.4 and aged for 16 hours at room temperature. The product is filtered, washed with water, and vacuum dried at 35° C., to yield 21.9 milligrams of crystalline chlorodemethyltetracycline neutral assaying 1250 gammas per milligram (50 percent yield).

*Example 14.—Reduction of chlorodemethyltetracycline to demethyltetracycline:* A 12.5-milligram sample of crystalline chlorodemethyltetracycline hydrochloride is dissolved in water and one drop of triethylamine is added thereto. The solution is mixed with 10 milligrams of 10 percent palladium on carbon, and shaken in a hydrogen atmosphere for 20 minutes. The resultant solution is filtered to remove the catalyst. Ultraviolet spectra and paper chromatography both indicate that dechlorination to demethyltetracycline occurs.

As indicated hereinabove, salts of the demethyltetracyclines may be formed by treatment with acids and bases. Hydrochloric acid is a preferred acid because the salts of this acid and the demethyltetracyclines are very useful products. Special properties may be imparted by the use of other acids, such as sulfuric acid, phosphoric acid, acetic, boric and other organic and inorganic acids. Salts with bases may be prepared with the alkali metal hydroxides, such as sodium hydroxide, and the alkaline earth metals as described above. The calcium salt is particularly useful and may be prepared by simply adjusting an aqueous solution of any one of the demethyltetracyclines to within the range 6–10 with at least a molar equivalent of the calcium being present in the solution. The barium, magnesium, strontium and other salts may be prepared in like manner. Complexes of the demethyltetracyclines with boron, zirconium, and other polyvalent metal ions are also formed, as in the case of the tetracyclines.

Obviously, if the fermentation medium contains no chlorine or bromine, neither chlorodemethyltetracycline nor bromodemethyltetracycline can be formed. In such a case, the principal antibiotic will be demethyltetracycline. As the chloride ion is raised, particularly above 50 parts per million, substantial quantities of chlorodemethyltetracycline are formed, as 1 part of chloride ion can result in the production of approximately 14 parts of chlorodemethyltetracycline. The amount of this latter antibiotic can be controlled. We prefer when producing this antibiotic that the fermentation medium contain over 50 parts per million of chloride ion and this amount may be increased up to 1000 parts per million or even more for maximum production of chlorodemethyltetracycline.

A small concentration of bromide ion in the fermentation medium from about 10 parts per million to several percent tends to depress the formation of chlorodemethyltetracycline, and the production of demethyltetracycline is generally increased. When the fermentation medium contains less than about 50 parts per million of chloride ion and more than about 50 parts per million of bromide ion, the production of bromodemethyltetracycline is favored; and with high-antibiotic-yielding strains of *S. aureofaciens*, the resulting fermented liquor may contain bromotetracycline as the predominating antibiotic.

We claim:

1. A compound selected from the group consisting of 6-demethyltetracycline, 7-chloro-6-demethyltetracycline, 7-chloro-6-demethyl-4-epi-tetracycline, 7-bromo-6-demethyltetracycline and 7-bromo-6-demethyl-4-epi-tetracycline, the mineral acid salts thereof, the alkali metal salts thereof, and the alkaline earth metal salts thereof.

2. 6-demethyltetracycline.

3. 7-chloro-6-demethyltetracycline.

4. 7-chloro-6-demethyl-4-epi-tetracycline.

5. 7-bromo-6-demethyltetracycline.

6. 7-bromo-6-demethyl-4-epi-tetracycline.

7. A process for producing 6-demethyltetracycline which comprises cultivating a microorganism selected from the group consisting of a 6-demethyltetracycline-producing strain of *Streptomyces aureofaciens* and mutants thereof in an aqueous nutrient medium containing assimilable sources of carbohydrate, nitrogen and inorganic salts and being substantially free of available chloride ions, under submerged aerobic conditions until substantial antibacterial activity due to 6-demethyltetracycline is imparted to said medium.

8. A process for producing 7-chloro-6-demethyltetracycline which comprises cultivating a microorganism selected from the group consisting of a 7-chloro-6-demethyltetracycline-producing strain of *Streptomyces aureofaciens* and mutants thereof in an aqueous nutrient medium containing assimilable sources of carbohydrate, nitrogen and inorganic salts and containing at least 50 parts per million of chloride ions, under submerged aerobic conditions until substantial antibacterial activity due to 7-chloro-6-demethyltetracycline is imparted to said medium.

9. A process for producing 7-bromo-6-demethyltetracycline which comprises cultivating a microorganism selected from the group consisting of a 7-bromo-6-demethyltetracycline-producing strain of *Streptomyces aureofaciens* and mutants thereof in an aqueous nutrient medium containing assimilable sources of carbohydrate, nitrogen and inorganic salts and containing at least 50 parts per million of bromide ions and less than 50 parts per million of chloride ions, under submerged aerobic conditions until substantial antibacterial activity due to 7-bromo-6-demethyltetracycline is imparted to said medium.

References Cited in the file of this patent

UNITED STATES PATENTS

| | | |
|---|---|---|
| 2,482,055 | Dugar | Sept. 13, 1949 |
| 2,609,329 | Niedercorn | Sept. 2, 1952 |
| 2,699,054 | Conover | Jan. 11, 1955 |
| 2,712,517 | Gourevitch et al. | July 5, 1955 |
| 2,734,018 | Minieri et al. | Feb. 7, 1956 |
| 2,739,924 | Lein et al. | Mar. 27, 1956 |

FOREIGN PATENTS

| | | |
|---|---|---|
| 21,416 | Union of South Africa | Oct. 28, 1954 |
| 461/55 | Union of South Africa | Oct. 19, 1955 |
| 526/55 | Union of South Africa | Oct. 19, 1955 |

OTHER REFERENCES

Doerschuk et al.: J. Am. Chem. Soc., vol. 77, Sept. 5, 1955, p. 4687.

Sensi et al.: Il Farmaco, vol. 10, June 1955, pp. 337 to 344.